United States Patent
Ackermann

(10) Patent No.: US 6,734,773 B2
(45) Date of Patent: May 11, 2004

(54) TRANSFORMER WITH INTEGRATED INDUCTOR

(75) Inventor: Bernd Ackermann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 12 days.

(21) Appl. No.: 10/125,727

(22) Filed: Apr. 18, 2002

(65) Prior Publication Data

US 2002/0167385 A1 Nov. 14, 2002

(30) Foreign Application Priority Data

Apr. 19, 2001 (DE) ......................... 101 19 106

(51) Int. Cl.[7] ............................. H01F 24/27
(52) U.S. Cl. ................. 336/178; 336/212; 336/214
(58) Field of Search ................. 336/212, 178, 336/220, 221, 222, 214

(56) References Cited

U.S. PATENT DOCUMENTS

| | | | |
|---|---|---|---|
| 3,868,538 A | * | 2/1975 | Blanchard .................. 315/411 |
| 4,613,841 A | * | 9/1986 | Roberts ....................... 336/83 |
| 4,766,365 A | * | 8/1988 | Bolduc et al. .............. 323/308 |
| 5,155,676 A | * | 10/1992 | Spreen ........................ 363/126 |
| 5,889,373 A | | 3/1999 | Fisher et al. ................ 315/307 |
| 6,348,848 B1 | * | 2/2002 | Herbert ....................... 336/178 |

FOREIGN PATENT DOCUMENTS

JP      410163045 A * 6/1998 ................. 336/212

OTHER PUBLICATIONS

Patent Abstracts of Japan, Okada Naoki, "Insulating Transformer And magnetic Core Unit For The Same," Publication No. 11307377, May 11, 1999, Application No. 1010662, 16/4/98.

* cited by examiner

Primary Examiner—Anh Mai

(57) ABSTRACT

A transformer having an additional integrated inductor includes a first core (1) having at least a primary winding (5), a second core (2) having at least a secondary winding (4), and a third core (3), in which each core (1, 2, 3) is a separate component.

9 Claims, 1 Drawing Sheet

TRANSFORMER WITH INTEGRATED INDUCTOR

BACKGROUND OF THE INVENTION

1. Field of the Invention

The present invention relates to a transformer with an additional integrated inductor, and to a switched-mode power supply comprising such a transformer.

Switched-mode power supplies require at least one inductive component and one capacitive component for the resonant circuit. The inductive component is usually a coil (inductor) which along with a capacitor is connected to the primary or secondary winding of a transformer.

2. Description of the Related Art

Such a switched-mode power supply with a resonant construction is known from U.S. Pat. No. 4,692,851. Here, the primary winding is connected in series with an inductor, whereas, on the secondary side, the main secondary winding has a parallel capacitance. In this way, the inductance of the inductor alone with the capacitance of the capacitor provide the necessary resonant oscillations.

SUMMARY OF THE INVENTION

It is an object of the present invention to provide a transformer with an integrated stray inductance so that a separate inductive component can be dispensed with and a simplification of the design of resonant switched-mode power supplies is possible.

This object as achieved, in accordance with the invention, in that a transformer is provided with a first core which has at least a primary winding, a second core which has at least a secondary winding, and a third core, each core being a separate component.

Through the structural separation of the individual cores, it is possible to optimize each of these in relation to the main flux or the stray flux. Nevertheless, standard components can be used, because each core only has one section. This reduces the manufacturing costs considerably. Since the main flux is dependent upon the so-called main permeance and the stray flux on the so-called stray permeance, these permeances must be selected accordingly. The permeances are, in turn, dependent upon the respective air gap between the individual cores, the respective air gap having a certain cross-sectional area and a certain length. The cores can, however, be bonded to each other when only little permeance is necessary.

Embodiments of the transformer as described above, in which the first core is separated from the second core by at least an air gap, and the second core is separated from the third core by at least a further air gap, and in which the air gap and the further air gap are designed so that the first core essentially carries a main flux, the third core essentially carries a stray flux, and the second core essentially carries the difference between the main flux and the stray flux, offer the advantage that the three cores can be optimally matched to the flux that they carry. Thus, both the main flux and the stray flux may be determined individually. In addition, the stray permeance and the main permeance can be determined via the air gap between the individual cores.

A further embodiment of the transformer as described above, in which the stray flux through the third core has the effect of an inductor integrated with the transformer, this inductor effectively being connected in series with the secondary winding, offers the major advantage that an additional coil (inductor) in series with either the primary winding or the secondary winding is not necessary since resonant switched-mode power supplies require such a coil, their structure is thus simplified since one component can be spared.

An embodiment of the transformer of the subject invention, as described above, in which the first core, the second core and the third core each have a standardized section, allows a particularly low-cost design of a transformer in accordance with the invention. The manufacturer of magnet cores for transformers offers all standard sections. Magnet cores with other sections are considerably more expensive which, in mass-production, is a factor that cannot be underestimated. It is therefore sensible to use standard components for the three magnet cores of different dimensions.

With the embodiment of the invention, in which a switched-mode power supply with a transformer provided with a first core having at least a primary winding, a second core having at least a secondary winding, and a third core, each core being a separate component, the advantage of the variable stray inductance of a transformer in a switched-mode power supply is used. This is preferably a resonant switched-mode power supply.

BRIEF DESCRIPTION OF THE DRAWING

The present invention is described in more detail using an example of embodiments and various Figures, in which.

DESCRIPTION OF THE PREFERRED EMBODIMENTS

Figure 2:
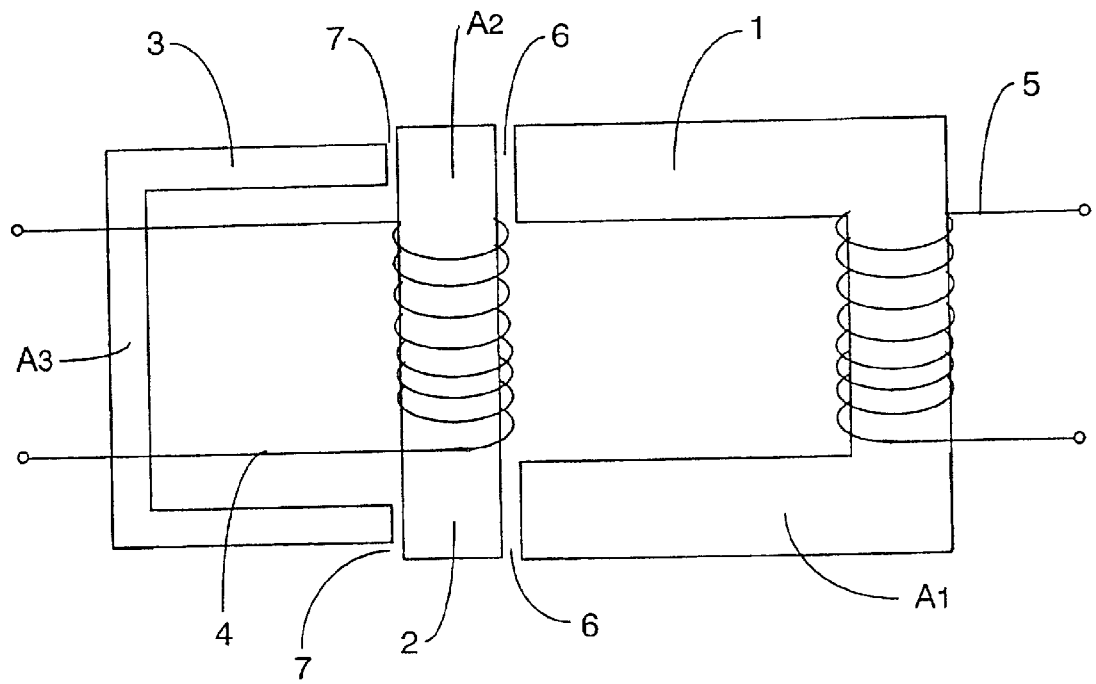
FIG. 2 shows a side view of a transformer in accordance with the invention.

A transformer with integrated inductor consists of an initial iron core 1 for the primary winding 5, a second iron core 2 for the secondary winding 4, and a third iron core 3 for the stray flux. All three iron cores 1, 2, 3 are separate components and are, therefore, structurally separated from each other by air gaps 6, 7. Thus, the sections of the individual cores can be dimensioned fully independently of each other. The first core 1 thereby carries the primary winding 5, while the second core 2 carries the secondary winding 4. The arrangement is designed in such a way that the first U-shaped core 1 with its open side is only separated from the second I-shaped core 2 by an air gap 6. This I-shaped core 2, in turn, borders on a third also U-shaped core 3, separated by an air gap 7, the core 3 facing the second core 2 with its open side and representing the stray flux core. The cores are thus arranged in a row, as can also be seen from FIG. 2. Since cores 1, 2 and 3 do not touch, they are mounted on a joint component in a manner not shown. This joint component may be a printed circuit board, as is customary in switched-mode power supplies. In addition, at least the air gap 6 between the first core 1 and the second core 2 can be dispensed with and, in its stead, another medium may be present. In particular, the first core 1 may also be secured to the second core 2 by bonding or some other means.

Figure 1:
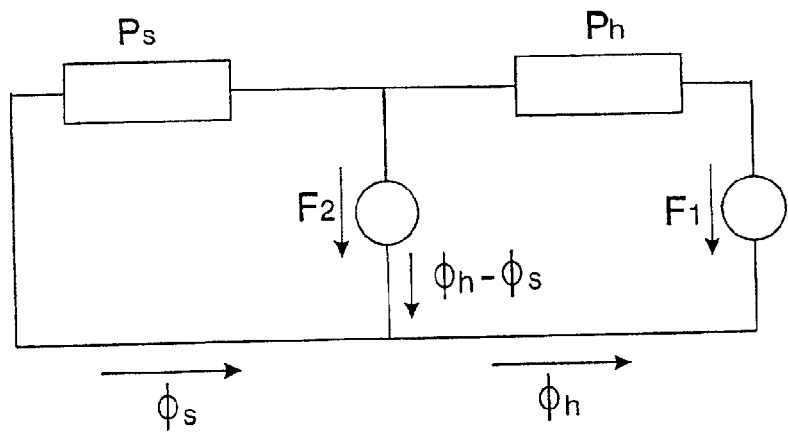
FIG. 1 shows an equivalent circuit diagram of the magnetic circuit in a transformer in accordance with the invention.

On the primary winding 5 with $N_1$ windings, a magnetic potential $F_1 = N_1 * I_1$ is applied, while, on the secondary winding 4 with $N_2$ windings, a corresponding magnetic potential $F_2 = N_2 * I_2$ is applied. The so-termed main permeance $P_h$, which determines the main inductance, is realized by the air gaps 6. These air gaps 6 each have a section $A_h$, which is identical with section $A_1$ of the first core 1 and a length $l_h$, which corresponds to the distance between the first core 1 and the second core 2. The central I-shaped core 2, accordingly, has the section $A_2$. The so-termed stray permeance $P_s$, which determines the stray inductance, is realized by the air gaps 7. These air gaps 7 each have a section $A_s$, which is identical with the section $A_3$ of the third core 3, and a length $l_s$, which corresponds to the distance between the third core 3 and the second core 2. Since the air gaps 6 and 7 are both present twice, the resultant permeances are $P_h = \mu_o * A_h / 2\ l_h$ for the main permeance $P_h$, and $P_s = \mu_o * A_s / 2\ l_s$ for the stray permeance $P_s$. The relationship with the currents $I_1$ and $I_2$ can be established from the two permeances and the magnetic resultant flows $\Phi_h$ and $\Phi_s$ in accordance with the magnetic equivalent circuit diagram in FIG. 1, because it holds that $\Phi_h = (F1 - F2) * P_h$ and $\Phi_s = F2 * P_s$. With the arrangement in accordance with the invention, the lengths $l_h$ and $l_s$ and the sections $A_2$, $A_h$ ($=A_1$) and $A_s$ ($=A_3$) can be selected independently of one another. This gives the constructor more freedom of design and allows optimum adaptation of the sections $A_1$, $A_2$ and $A_3$ of the cores 1, 2, 3 to the respective resultant magnetic flux to be conveyed.

The permeances and the inductances can be freely selected over the lengths $l^h$ and $l_s$. In spite of this, standard sections can also be used here to reduce costs, if each core has its own standard section. The forming of cores 1 and 3 into a U-shape and core 2 into an I-shape is, of course, not the only conceivable solution. In particular, the legs of the two U-shaped cores 1 and 3 can be made longer or shorter. It is also possible to arrange core 1 or core 3 relative to core 2 offset at an angle of, for example, 90°. In this way, the length of the arrangement is shortened, so that then a larger width is needed. Overall, however, this makes the transformer more compact.

What is claimed is:

1. A transformer provided with three cores arranged in a row, a first of said three cores, arranged at one end of the row, carrying at least a primary winding, a second of said three cores, arranged in the middle of the row, carrying at least a secondary winding, and a third of said cores, arranged at the other end of the row, representing a stray flux core, said first core being separated from said second core by at least one air gap, and said second core being separated from said third core by at least one further air gap.

2. The transformer as claimed in claim 1, characterized in that the at least one air gap and the at least one further air gap are designed so that the first core essentially carries a main flux, the third core essentially carries a stray flux, and the second core essentially carries a difference between the main flux and the stray flux.

3. The transformer as claimed in claim 2, characterized in that the stray flux through the third core has the effect of an inductor integrated with the transformer, in which the inductor is connected in series with the secondary winding.

4. The transformer as claimed in claim 1, characterized in that the first core has a U-shaped design.

5. The transformer as claimed in claim 1, characterized in that the third core has a U-shaped design.

6. The transformer as claimed in claim 1, characterized in that the second core has an I-shaped design.

7. The transformer as claimed in claim 1, characterized in that the first core, the second core and the third core each have different sections.

8. The transformer as claimed in claim 1, characterized in that the first core, the second core and the third core each have a standardized section.

9. A switched-mode power supply comprising a transformer provided with three cores arranged in a row, a first of said three cores, arranged at one end of the row, carrying at least a primary winding, a second of said three cores, arranged in the middle of the row, carrying at least a secondary winding, and a third of said cores, arranged at the other end of the row, representing a stray flux core, said first core being separated from said second core by at least one air gap, and said second core being separated from said third core by at least one further air gap.

* * * * *